(12) United States Patent
Unno et al.

(10) Patent No.: US 11,371,909 B2
(45) Date of Patent: Jun. 28, 2022

(54) LIFESPAN DIAGNOSIS DEVICE, METHOD, NON-TRANSITORY STORAGE MEDIUM, AND SYSTEM FOR MOTION GUIDANCE DEVICE

(71) Applicant: THK CO., LTD., Tokyo (JP)

(72) Inventors: Akihiro Unno, Tokyo (JP); Yuki Hayashi, Tokyo (JP); Yuki Tanaka, Tokyo (JP); Tomofumi Ohashi, Tokyo (JP); Yusuke Asano, Tokyo (JP); Katsunori Kogure, Tokyo (JP)

(73) Assignee: THK CO., LTD., Tokyo (JP)

(*) Notice: Subject to any disclaimer, the term of this patent is extended or adjusted under 35 U.S.C. 154(b) by 480 days.

(21) Appl. No.: 16/473,312

(22) PCT Filed: Dec. 21, 2017

(86) PCT No.: PCT/JP2017/045915
§ 371 (c)(1),
(2) Date: Jun. 25, 2019

(87) PCT Pub. No.: WO2018/123802
PCT Pub. Date: Jul. 5, 2018

(65) Prior Publication Data
US 2020/0103311 A1 Apr. 2, 2020

(30) Foreign Application Priority Data

Dec. 28, 2016 (JP) .............................. JP2016-256586

(51) Int. Cl.
*G01M 13/04* (2019.01)
*G01L 5/00* (2006.01)

(52) U.S. Cl.
CPC ........... *G01M 13/04* (2013.01); *G01L 5/0019* (2013.01)

(58) Field of Classification Search
CPC ....... G01M 13/04; G01L 5/0019; F16C 29/06
See application file for complete search history.

(56) References Cited

U.S. PATENT DOCUMENTS

2007/0237435 A1 10/2007 Nagao et al.
2020/0284297 A1* 9/2020 Asano ................. F16C 29/0647

FOREIGN PATENT DOCUMENTS

JP 2007-263286 A 10/2007
JP 2009074853 A * 4/2009

OTHER PUBLICATIONS

International Search Report dated Mar. 13, 2018, issued in counterpart application No. PCT/JP2017/045915, w/English translation (4 pages).

* cited by examiner

*Primary Examiner* — Manuel L Barbee
(74) *Attorney, Agent, or Firm* — WHDA, LLP

(57) ABSTRACT

A lifespan diagnosis device for a motion guidance device including: a stress calculating means which calculates stresses during movement for each of virtual segments, the stresses during movement being stresses that occur in each segment during a movement of the moving member; a counting means which counts, for each of the segments, on the basis of the amount of displacement, the number of occurrences of the stresses during movement which repetitively occur with waving during a movement of the moving member along the track; and a diagnostic means which calculates, for each of the segments, a lifespan exhaustion ratio on the basis of magnitudes of the stresses during movement and the number of occurrences of the stresses during movement, and which diagnoses the lifespan of the motion guidance device on the basis of the calculated lifespan exhaustion ratios of the respective segments.

7 Claims, 13 Drawing Sheets

LIFESPAN DIAGNOSIS DEVICE, METHOD, NON-TRANSITORY STORAGE MEDIUM, AND SYSTEM FOR MOTION GUIDANCE DEVICE

TECHNICAL FIELD

The present application discloses a lifespan diagnosis device, method, non-transitory storage medium, and system for a motion guidance device.

BACKGROUND ART

Components for guiding a movable part along its course are used in various apparatuses including robots, machine tools, and semiconductor/liquid crystal manufacturing apparatuses. For example, a linear guide is used at locations where a movable part travels in a straight line. When selecting such components, while components having a load rating that contains a margin with respect to a load multiplied by a factor of safety are normally selected, in recent years, attempts are being made to manage components in a more qualified manner by, for example, mounting a strain gauge to a component and calculating an actual load applied to the component (for example, refer to PTL 1).

CITATION LIST

Patent Literature

[PTL 1] Japanese Patent Application Laid-open No. 2007-263286

SUMMARY OF INVENTION

Technical Problem

With a motion guidance device that guides a movable part along its course, when fatigue accumulates in a material forming a rolling surface with which a rolling element comes into contact, guiding accuracy may possibly decline. In consideration thereof, while it is conceivable to perform a lifespan diagnosis by measuring a load applied to a rolling surface in order to ascertain fatigue of a material forming the rolling surface, for example, when an actual load measurement system using the strain gauge described above is used, since it is difficult to perceive fatigue of the rolling surface for each portion thereof with the strain gauge, it is difficult to predict a lifespan due to localized fatigue of the rolling surface.

In consideration thereof, the present application discloses a lifespan diagnosis device, method, non-transitory storage medium stored with a program, and system for a motion guidance device which are capable of diagnosing a lifespan with high precision.

Solution to Problem

In order to solve the problem described above, in the present invention, on the basis of an amount of displacement of a moving member with respect to a track formed by a track member of a motion guidance device, stresses that occur in each of virtual segments defined by dividing a rolling surface are calculated, the number of occurrences of the stresses is counted for each segment, and a lifespan diagnosis of the motion guidance device is performed using a lifespan exhaustion ratio of each segment calculated on the basis of magnitudes of the stresses and the number of occurrences of the stresses.

More specifically, the present invention is a lifespan diagnosis device for a motion guidance device in which a moving member is assembled so as to be relatively movable to a track member via a plurality of rolling elements, the lifespan diagnosis device for a motion guidance device including: a stress calculating unit configured to calculate stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member; a counting unit configured to count, for each of the segments, on the basis of the amount of displacement, the number of occurrences of the stresses during movement which repetitively occur with waving during a movement of the moving member along the track; and a diagnostic unit configured to calculate, for each of the segments, a lifespan exhaustion ratio on the basis of magnitudes of the stresses during movement and the number of occurrences of the stresses during movement, and diagnose the lifespan of the motion guidance device on the basis of the calculated lifespan exhaustion ratios of the respective segments.

In this case, waving refers to an attitude change or a vibration (a pulsation) of the moving member which is caused by a periodic shift in a relative position of the rolling element with respect to the rolling surface. Since waving is manifested as a minute displacement that periodically occurs with a movement of the moving member, in the lifespan diagnosis device described above, the number of occurrences of stresses that repetitively occur with waving is counted and used for diagnosing a lifespan of a motion diagnosis device which is attributable to fatigue of the material which is caused by the rolling element repetitively imparting stresses to the rolling surface.

In addition, for example, when a direction perpendicular to the track formed by the track member is defined as a radial direction, since waving is manifested as a vibration component in a relative displacement along the radial direction of the moving member with respect to the track member, in the lifespan diagnosis device described above, a frequency of waving when the moving member moves along the track formed by the track member is counted on the basis of an amount of displacement of the moving member with respect to the track. In the lifespan diagnosis device described above, since stresses that occur on the rolling surface is calculated on the basis of an amount of relative displacement of the moving member with respect to the track member, by also counting the number of occurrences of stresses that repetitively occur with waving on the basis of the amount of relative displacement, data of the amount of displacement of the moving member with respect to the track is effectively utilized.

In the motion guidance device to be diagnosed by the lifespan diagnosis device described above, since the moving member is assembled so as to be relatively movable to the track member via a plurality of rolling elements, the plurality of rolling elements are in contact with the rolling surface. An ability of the motion guidance device to guide the moving member along its course may possibly become impaired even when the rolling surface is locally impaired. In consideration thereof, in the lifespan diagnosis device described above, by calculating stresses for each of virtual segments defined by dividing a rolling surface of the moving member along a direction of the track, diagnostic accuracy is improved in comparison to a lifespan diagnosis on the basis of stresses of an entire rolling surface. While partial fatigue can be perceived and diagnostic accuracy can be improved in comparison to a lifespan diagnosis on the basis of stresses of an entire rolling surface as long as there are at least two virtual segments, for example, when there are a same number of segments as the number of rolling elements in contact with the rolling surface, since a correspondence relationship between stresses that occur in each segment of the rolling elements and loads acting on each rolling element can be easily ascertained, the stresses during movement can be more readily calculated.

The present invention can also be viewed from the aspects of a method, a non-transitory storage medium stored with a computer program, and a system. For example, the present invention may be a lifespan diagnosis method for a motion guidance device in which a moving member is assembled so as to be relatively movable to a track member via a plurality of rolling elements, the lifespan diagnosis method for a motion guidance device including: calculating stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member; counting, for each of the segments, on the basis of the amount of displacement, the number of occurrences of the stresses during movement which repetitively occur with waving during a movement of the moving member along the track; and calculating, for each of the segments, a lifespan exhaustion ratio on the basis of magnitudes of the stresses during movement and the number of occurrences of the stresses during movement, and diagnosing the lifespan of the motion guidance device on the basis of the calculated lifespan exhaustion ratios of the respective segments.

The lifespan diagnosis device, method, non-transitory storage medium stored with a program, and system described above are capable of diagnosing a lifespan of a motion guidance device with high precision.

DESCRIPTION OF EMBODIMENTS

An embodiment of the present invention will be described below. The embodiment described below merely represents an example of an embodiment of the present invention and is not intended to limit the technical scope of the present invention to the following aspects.

Figure 1:
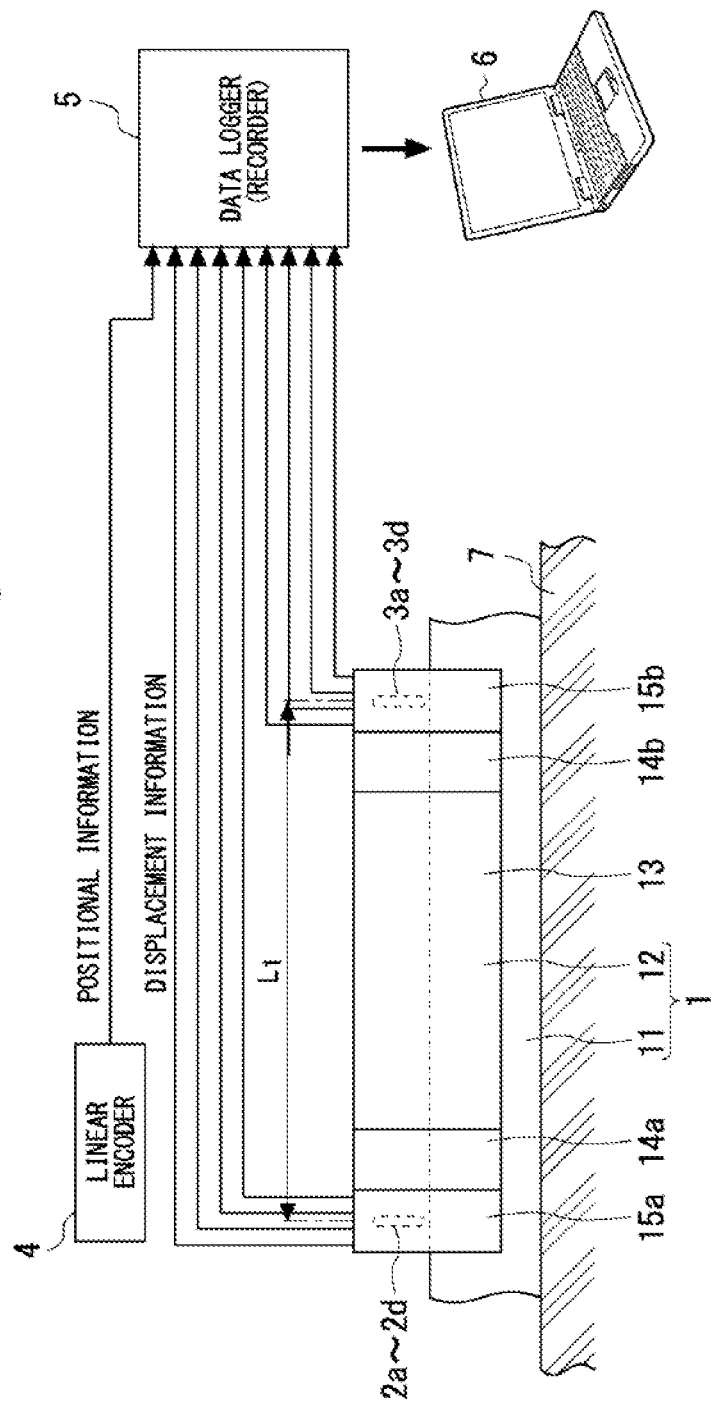
FIG. 1 is an overall view of a lifespan diagnosis system for a motion guidance device according to an embodiment of the present invention.

FIG. 1 is an overall view of a lifespan diagnosis system for a motion guidance device according to the present embodiment. Reference character 1 denotes a motion guidance device, reference characters 2*a* to 2*d* and 3*a* to 3*d* denote sensors, reference character 4 denotes a linear encoder, reference character 5 denotes a data logger, and reference character 6 denotes a computer (an example of a "lifespan diagnosis device" as described in the present application).

First, a configuration of the motion guidance device 1 will be described. The motion guidance device 1 includes a rail 11 (an example of a "track member" as described in the present application) and a carriage 12 (an example of a "moving member" as described in the present application) which is assembled so as to be relatively movable along a longitudinal direction of the rail 11. In the present embodiment, the rail 11 is mounted to a base 7 of an actual machine and a table 8 (refer to FIG. 9) of the actual machine is mounted to the carriage 12. Examples of the actual machine include a robot, a machine tool, and a semiconductor or liquid crystal manufacturing apparatus. A direction of moment of a movable part including the table 8 is guided by the motion guidance device 1. It should be noted that the motion guidance device 1 can be vertically flipped and have the carriage 12 mounted to the base 7 and the rail 11 mounted to the table 8. In addition, the motion guidance device 1 may be used in a state where the longitudinal direction of the rail 11 is inclined or perpendicular with respect to a horizontal plane instead of being horizontal.

Figure 2:
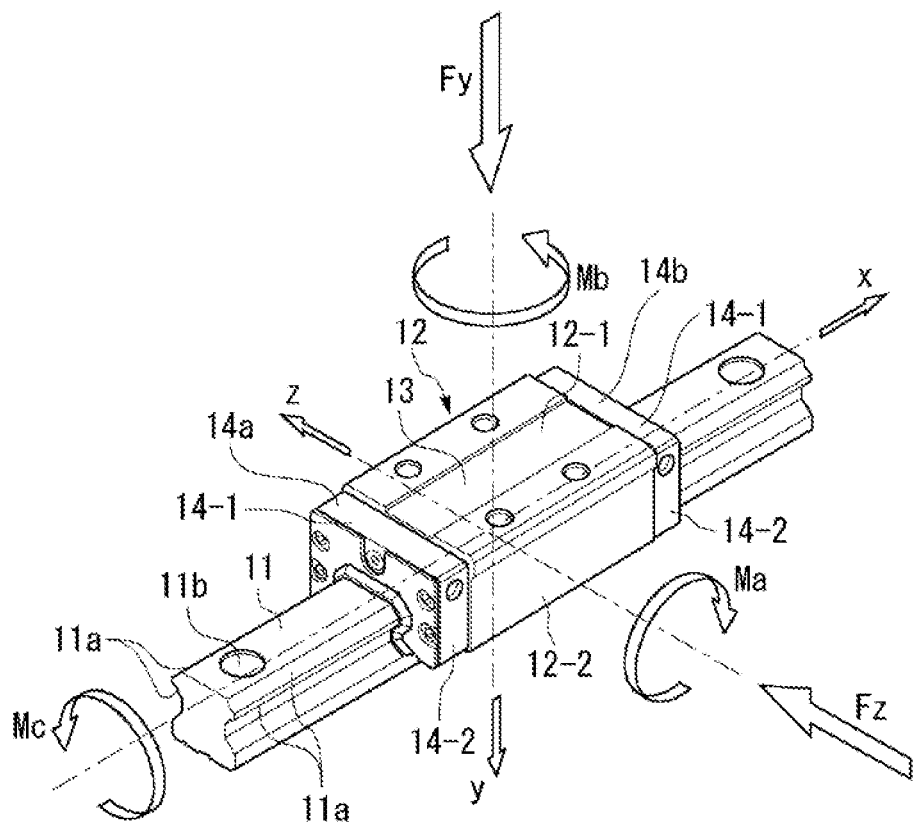
FIG. 2 is an external perspective view of the motion guidance device according to the present embodiment.

FIG. 2 shows an external perspective view of the motion guidance device 1. For the purpose of illustration, the configuration of the motion guidance device 1 will be described on the assumption that the rail 11 is arranged on a horizontal plane, a direction viewed from the longitudinal direction of the rail 11 or, in other words, an x axis shown in FIG. 2 is a front-back direction, a y axis shown in FIG. 2 is a vertical direction, and a z axis shown in FIG. 2 is a horizontal direction. It is needless to say that an arrangement of the motion guidance device 1 is not limited to this arrangement.

Two (upper and lower) band-like rolling surfaces 11*a* are provided on each of left and right sides of the rail 11. The rolling surface 11*a* has an arc-like cross section. Through-holes 11*b* through which a fastening member for fastening the rail 11 to the base 7 is passed are provided at an appropriate pitch along the longitudinal direction on an upper surface of the rail 11.

The carriage 12 has a C-shaped cross section constituted by a horizontal part 12-1 which opposes the upper surface of the rail 11 and a pair of side parts 12-2 which oppose side surfaces of the rail 11. The carriage 12 includes a carriage main body 13 at center in a movement direction, a pair of lid members 14a and 14b arranged at both ends in a movement direction of the carriage main body 13, and a pair of sensor mounting members 15a and 15b (refer to FIG. 1) arranged at both ends in a movement direction of the pair of lid members 14a and 14b. The lid members 14a and 14b have a C-shaped cross section constituted by a horizontal part 14-1 which opposes the upper surface of the rail 11 and a pair of side parts 14-2 which oppose the side surfaces of the rail 11. The sensor mounting members 15a and 15b similarly have a C-shaped cross section constituted by a horizontal part 15-1 which opposes the upper surface of the rail 11 and a pair of side parts 15-2 which oppose the side surfaces of the rail 11 (refer to FIG. 4(a)). The lid members 14a and 14b are fastened to the carriage main body 13 by fastening members such as bolts. The sensor mounting members 15a and 15b are fastened to the carriage main body 13 and the lid members 14a and 14b by fastening members such as bolts. It should be noted that the sensor mounting members 15a and 15b have been omitted in FIGS. 2 and 3.

Figure 3:
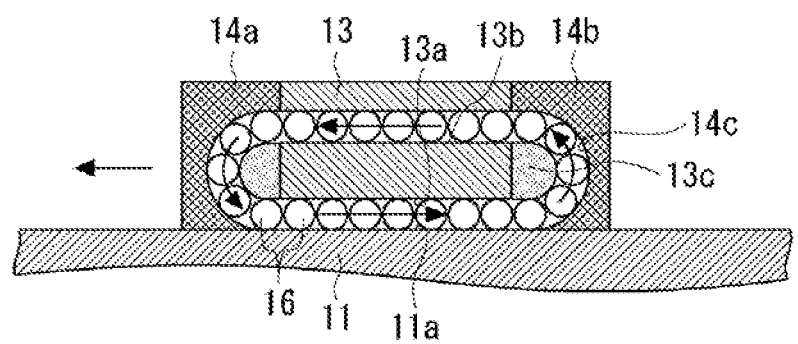
FIG. 3 is a diagram showing an outline of an internal structure of the motion guidance device according to the present embodiment.

FIG. 3 is a diagram showing an outline of an internal structure of the motion guidance device 1. As shown in FIG. 3, the carriage main body 13 is provided with four band-like rolling surfaces 13a which oppose the four band-like rolling surfaces 11a of the rail 11. The carriage main body 13 is provided with a return path 13b which is parallel to each rolling surface 13a. The lid members 14a and 14b are provided with U-shaped turnaround paths 14c which connect each rolling surface 13a and each return path 13b to each other. An inner circumferential side of the turnaround path 14c is constituted by an inner circumferential part 13c which has a hemispherical cross section and which is integrated with the carriage main body 13. A track-like circulatory path is constituted by a load rolling path between the rolling surface 11a of the rail 11 and the rolling surface 13a of the carriage main body 13, the pair of turnaround paths 14c, and the return path 13b. The circulatory path houses a plurality of balls 16 (an example of "rolling elements" as described in the present application). When the carriage 12 relatively moves with respect to the rail 11, the balls 16 interposed between the rail 11 and the carriage 12 roll along the load rolling path. The balls 16 having rolled to one end of the load rolling path is introduced to one of the turnaround paths 14c, advances along the return path 13b and then the other turnaround path 14c, and returns to another end of the load rolling path.

<Configuration of Sensor>

As shown in FIG. 1, the sensors 2a to 2d and 3a to 3d are, for example, capacitance type displacement meters and detect a displacement of the carriage 12 with respect to the rail 11 in a contact-less manner (refer to enlarged view of FIG. 4(b)). As described above, the pair of sensor mounting members 15a and 15b are mounted to both ends of the carriage 12 in the movement direction. Four sensors 2a to 2d are mounted to one sensor mounting member 15a. The four sensors 2a to 2d are arranged at a same position in the longitudinal direction of the rail 11. Four sensors 3a to 3d are similarly mounted to the other sensor mounting member 15b. The four sensors 3a to 3d are arranged at a same position in the longitudinal direction of the rail 11. A distance between the sensors 2a to 2d and the sensors 3a to 3d in the longitudinal direction of the rail 11 is denoted by $L_1$ (refer to FIG. 1). Alternatively, the respective sensors 2a to 2d and 3a to 3d can also be arranged in a staggered manner along the movement direction of the carriage 12.

Figure 4:
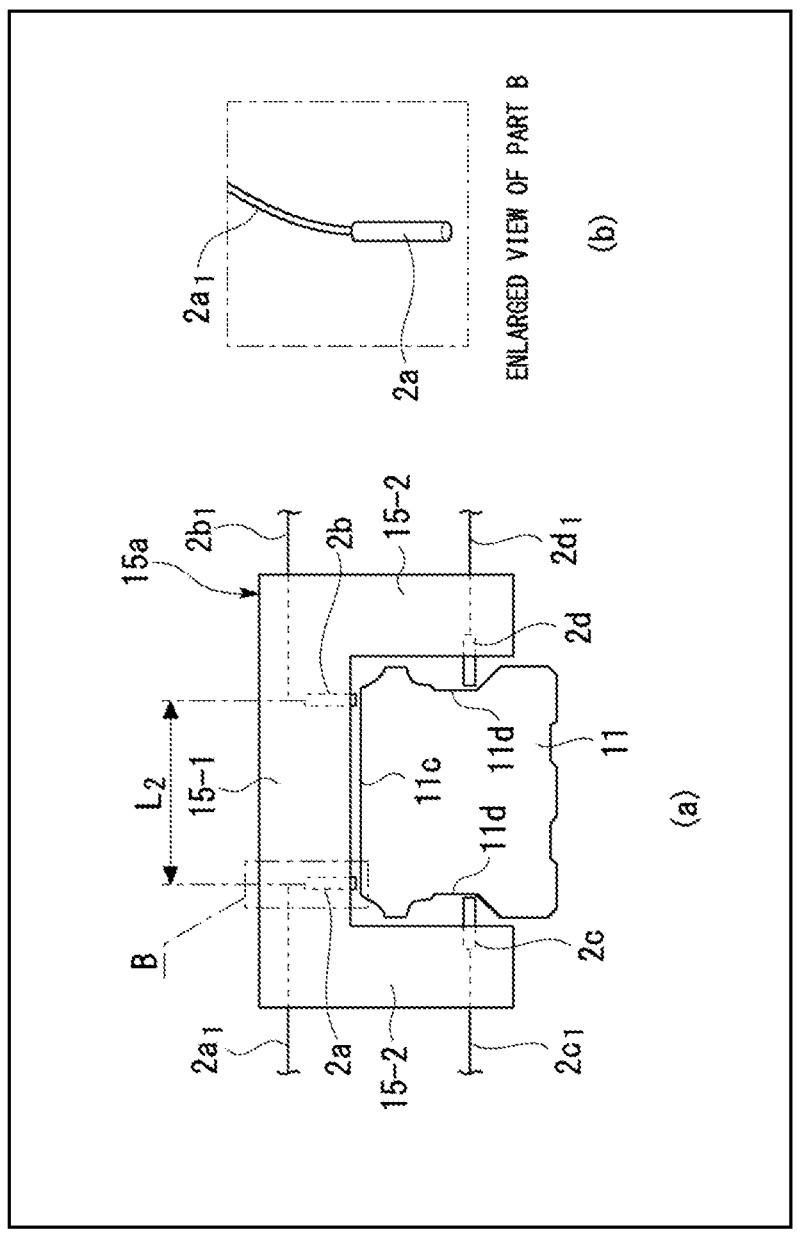
FIG. 4(*a*) is a front view of the motion guidance device as viewed from a longitudinal direction of a rail, and FIG. 4 (*b*) is an enlarged view of part B.

FIG. 4 shows the sensor mounting member 15a as viewed from the longitudinal direction of the rail 11. As described above, the sensor mounting member 15a has the horizontal part 15-1 which opposes an upper surface 11c of the rail 11 and the pair of side parts 15-2 which oppose the left and right side surfaces of the rail 11. Two sensors 2a and 2b which detect a displacement in a radial direction are arranged in the horizontal part 15-1. The sensors 2a and 2b face each other across a gap on the upper surface 11c of the rail 11 and detect a gap to the upper surface 11c of the rail 11. A distance between the two sensors 2a and 2b in the horizontal direction is denoted by $L_2$.

Two sensors 2c and 2d which detect a displacement in the horizontal direction are arranged in the pair of side parts 15-2. The sensors 2c and 2d face each other across a gap on a side surface 11d of the rail 11 and detect a gap to the side surface 11d.

In a state where the rail 11 is assumed to be arranged on a horizontal plane, the sensors 2a and 2b and the sensors 2c and 2d are arranged lower than an upper surface (a mounting surface) of the carriage 12. This arrangement is adopted in order to allow the table 8 to be mounted on the upper surface (the mounting surface) of the carriage 12. Cables $2a_1$ to $2d_1$ of the sensors 2a to 2d are drawn out in the horizontal direction from the side part 15-2 of the sensor mounting member 15a. Alternatively, the cables $2a_1$ to $2d_1$ can be drawn out toward the front (in a direction perpendicular to a paper plane) from a front surface of the sensor mounting member 15a. In addition, a height of an upper surface of the sensor mounting member 15a can be set lower than the upper surface (the mounting surface) of the carriage 12 and a gap between the upper surface of the sensor mounting member 15a and the table 8 can be utilized as a gap for drawing out the cables $2a_1$ and $2b_1$.

In a similar manner to the sensor mounting member 15a, the sensor mounting member 15b shown in FIG. 1 has the horizontal part 15-1 and the side parts 15-2 and the sensors 3a to 3d are arranged at positions respectively corresponding to the sensors 2a to 2d.

<Configuration of Linear Encoder>

The linear encoder 4 detects a position of the carriage 12 in an x axis direction. For example, the linear encoder 4 includes a scale which is mounted to the base 7 of the actual machine or the rail 11 and a head which is mounted to the table 8 of the actual machine or the carriage 12 and which reads the scale. It should be noted that a position detecting unit which detects a position of the carriage 12 on the rail 11 is not limited to a linear encoder. For example, when the table of the actual machine is ball screw-driven, a rotary encoder which detects an angle of a motor for driving a ball screw can be used as the position detecting unit.

<Configurations of Data Logger and Computer>

Displacement information of the carriage 12 detected by the sensors 2a to 2d and 3a to 3d is recorded in each prescribed sampling period in the data logger 5 which is a recorder. Positional information of the carriage 12 detected by the linear encoder 4 is also recorded in each prescribed sampling period in the data logger 5. The data logger 5 transmits the recorded displacement information and positional information to a computer 6 via a wired or wireless communicating unit. The data logger 5 is arranged in a vicinity of the actual machine. The computer 6 is arranged in a vicinity of the actual machine or at a remote location.

The sensors 2a to 2d and 3a to 3d detect an amount of displacement of the carriage 12 with respect to the rail 11. The amount of displacement of the carriage 12 with respect to the rail 11 represents a difference from a detected value of the sensors 2a to 2d and 3a to 3d in an unloaded state where no load is applied to the carriage 12. In consideration thereof, in the data logger 5 to which displacement information is sent from the sensors 2a to 2d and 3a to 3d, a value obtained by subtracting a detected value of the sensors 2a to 2d and 3a to 3d in an unloaded state and stored in advance from the value of the displacement information sent from the sensors 2a to 2d and 3a to 3d is recorded as the amount of displacement of the carriage 12 with respect to the rail 11.

Figure 5A:
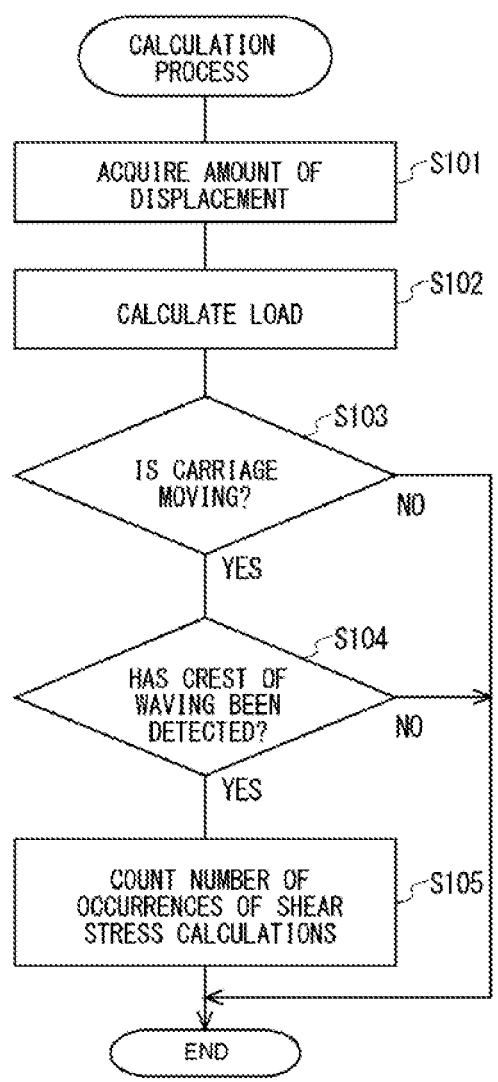
FIG. 5A is a diagram showing a first process flow of a lifespan diagnosis executed by a computer.
Figure 5B:
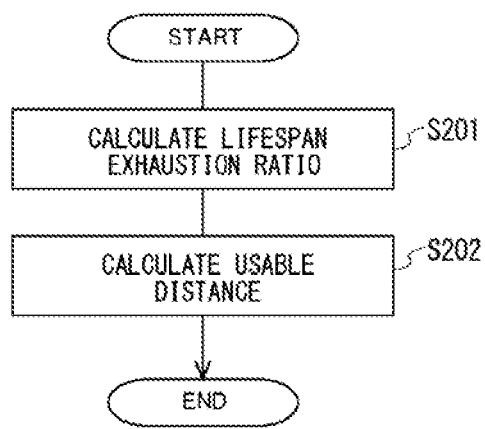
FIG. 5B is a diagram showing a second process flow of the lifespan diagnosis executed by a computer.

The computer 6 performs a lifespan diagnosis of the motion guidance device 1 using information recorded on the data logger 5. FIG. 5A is a diagram showing a first process flow of the lifespan diagnosis executed by the computer 6. In addition, FIG. 5B is a diagram showing a second process flow of the lifespan diagnosis executed by the computer 6. By repetitively executing the first process flow shown in FIG. 5A while the actual machine in which the motion guidance device 1 is being used is in operation, the computer 6 acquires data related to a repetitive load that accompanies waving during a movement of the carriage 12 along the track of the rail 11. In addition, for example, by executing the second process flow shown in FIG. 5B at a regular timing such as every time the first process flow is repeated 100 times or every few minutes or few hours while the actual machine is operational or at an irregular timing such as during maintenance of the actual machine, the computer 6 performs a lifespan diagnosis on the basis of data generated by the first process flow.

<Outline of Lifespan Diagnosis>

First, an outline of the first process flow shown in FIG. 5A will be described.

During an operation of the actual machine which involves using the motion guidance device 1, the computer 6 acquires an amount of displacement of the carriage 12 from the respective sensors 2a to 2d and 3a to 3d (S101). The acquired amount of displacement of the carriage 12 is recorded in the data logger 5. Subsequently, on the basis of data of the amount of displacement of the carriage 12 acquired in step S101, the computer 6 calculates a load acting on the carriage 12 (S102).

The calculated load is used to calculate stresses that occur in each part of the rolling surface 13a of the carriage main body 13. When calculating the stresses that occur in each part of the rolling surface 13a, the computer 6 first determines whether or not the carriage 12 is moving on the basis of positional information of the carriage 12 detected by the linear encoder 4 (S103).

Examples of phenomena that indicate a lifespan of the motion guidance device 1 include a scale-like detachment (hereinafter, referred to as "flaking") which occurs on the rolling surface 13a. Flaking occurs when shear stresses from the rolling surface 13a being subjected to a load of the balls 16 are repetitively applied to a slightly deeper position than the rolling surface 13a and a material forming the rolling surface 13a becomes fatigued. In this case, since a repetitive load that accompanies waving during a movement of the carriage 12 is a primary cause of the repetitive occurrences of the shear stresses at a slightly deeper position than the rolling surface 13a, when a positive determination is made in step S103, the computer 6 detects a crest of the waving on the basis of the amount of displacement and the positional information of the carriage 12 (S104). On the other hand, when a negative determination is made in S103, the present calculation process is ended. Subsequently, when a crest of the waving is detected in step S104, the computer 6 calculates shear stresses that occur in each part of the rolling surface 13a when the carriage 12 is moving on the basis of the load calculated in step S102 and performs an addition process of adding a counter value to a counter that counts the number of occurrences of stresses for each magnitude of the stresses and each portion of the rolling surface 13a (S105). The present calculation process ends unless a crest of waving is detected in S104.

As a result of the first process flow described above which includes the series of processes from step S101 to step S105 being repetitively executed, the number of occurrences of shear stresses that are repetitively applied to each part of the rolling surface 13a of the carriage 12 due to a load amplitude during a movement of the carriage 12 is aggregated for each magnitude of the stresses and each portion of the rolling surface 13a. The aggregated data is to be used in the second process flow of which an outline will be described next in order to ascertain fatigue of each portion of the rolling surface 13a which progresses due to repetitive loads.

Next, an outline of the second process flow shown in FIG. 5B will be described. Using data of the number of occurrences of stresses for each portion of the rolling surface 13 having been aggregated by repetitively executing the first process flow, the computer 6 performs a calculation of a lifespan exhaustion ratio using a linear cumulative damage rule (sometimes also referred to as the "Miner rule") (S201). Subsequently, the computer 6 calculates a remaining usable distance (period) of the carriage 12 (S202).

Hereinafter, details of each step will be described.

<S101>

During an operation of the actual machine which involves using the motion guidance device 1, the computer 6 acquires an amount of displacement of the carriage 12 from the respective sensors 2a to 2d and 3a to 3d. Since a measured value of the respective sensors 2a to 2d and 3a to 3d is a distance from the sensor to the rolling surface, the computer 6 uses a distance from the sensor to the rolling surface in an unloaded state where no load is applied to the carriage 12 as a reference and stores a difference from the reference distance as an amount of displacement of the carriage 12 in the data logger 5.

<S102>

Next, details of step S102 will be described. The computer 6 calculates a load acting on the carriage 12 on the basis of a displacement of the carriage 12. When calculating the load, the computer 6 first calculates five displacement components of the carriage 12 on the basis of an amount of displacement acquired from each of the sensors 2a to 2d and 3a to 3d. Next, on the basis of the five displacement components, the computer 6 calculates a load acting on each of the plurality of balls 16 and a contact angle of each ball 16. Subsequently, on the basis of the load and the contact angle of each ball 16, the computer 6 calculates the load (five external force components) which acts on the carriage 12. Details of the three steps described above will be provided below.

<Calculation of Five Displacement Components of Carriage>

As shown in FIG. 2, when x-y-z coordinate axes are set to the motion guidance device 1, loads that act on a coordinate origin of the x-y-z coordinate axes are $F_y$ denoting a sum of a radial load and a reverse radial load and $F_z$ denoting a horizontal load. The radial load is a load acting in a positive direction of the y axis shown in FIG. 2 which is a direction in which the carriage 12 is pressed against the rail 11. The reverse radial load is a load in an opposite direction thereof or, in other words, a direction in which the carriage 12 is separated from the rail 11. The horizontal load is a load acting in positive and negative directions of the z axis shown in FIG. 2 which are directions in which the carriage 12 is laterally shifted with respect to the rail 11.

In addition, moments around the x-y-z coordinate axes are $M_a$ denoting a sum of pitching moments, $M_b$ denoting a sum of yawing moments, and $M_c$ denoting a sum of rolling moments. The radial load $F_y$, the pitching moment $M_a$, the rolling moment $M_c$, the horizontal load $F_z$, and the yawing moment $M_b$ act on the carriage 12 as external forces. When these five external force components act on the carriage 12, five displacement components respectively corresponding to the five external force components or, more specifically, a radial displacement $\alpha_1$ (mm), a pitch angle $\alpha_2$ (rad), a roll angle $\alpha_3$ (rad), a horizontal displacement $\alpha_4$ (mm), and a yaw angle $\alpha_5$ (rad) are generated on the carriage 12.

Figure 6:
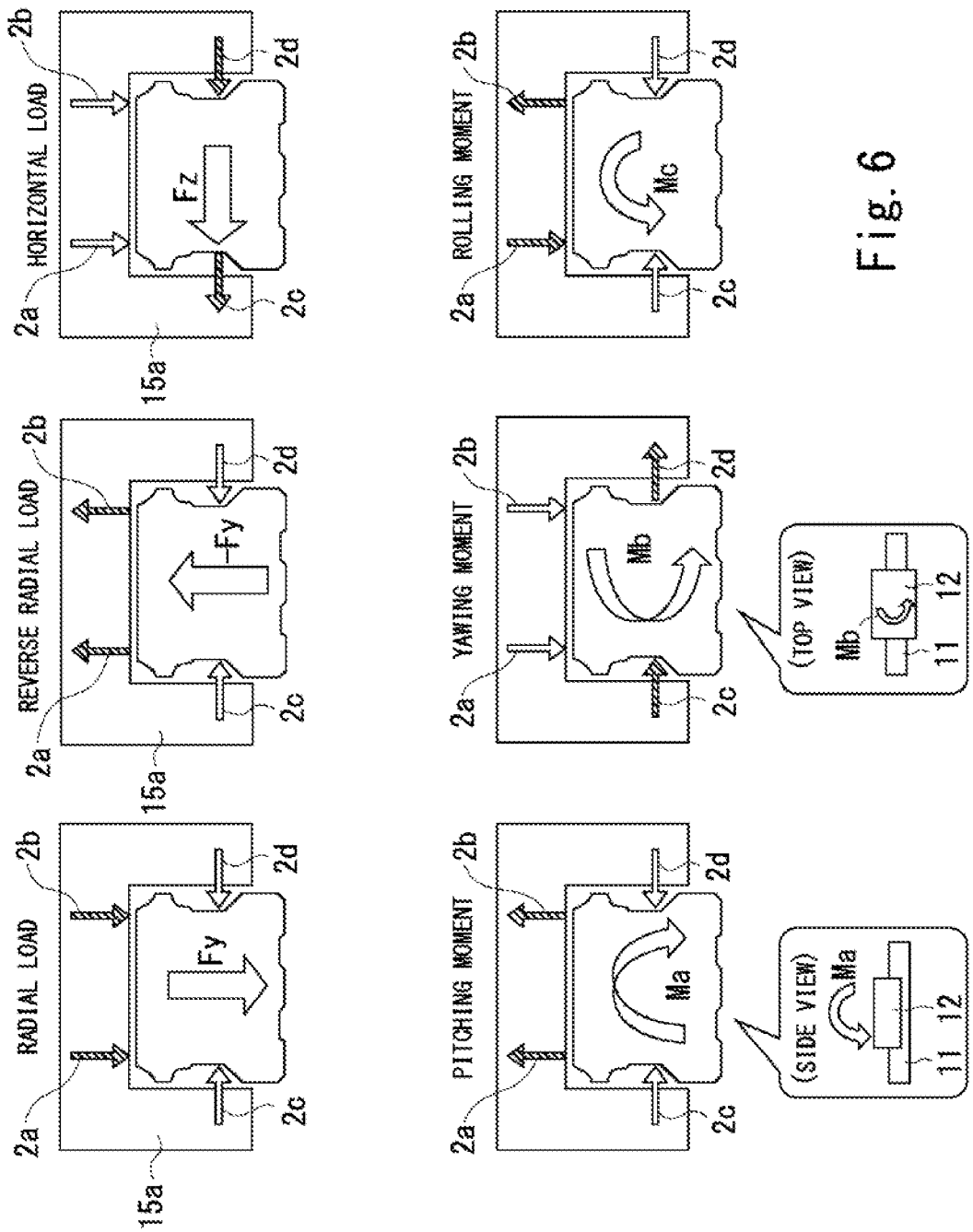
FIG. 6 is a diagram showing a change in output of sensors when external forces act on a carriage.

FIG. 6 shows a change in outputs of the sensors 2a to 2d when external forces act on the carriage 12. In FIG. 6, arrows with diagonal hatchings indicate sensors of which an output changes and blank arrows indicate sensors of which an output does not change. When the radial load $F_y$ acts on the carriage 12, a gap in the vertical direction between the carriage 12 and the rail 11 decreases. On the other hand, when the reverse radial load $-F_y$ acts on the carriage 12, a gap in the vertical direction between the carriage 12 and the rail 11 increases. The sensors 2a and 2b detect a change (a displacement) of the gap in the vertical direction. It should be noted that the sensors 3a and 3b mounted to the sensor mounting member 15b (refer to FIG. 1) also detect a displacement in the vertical direction.

When the radial load $F_y$ or the reverse radial load $-F_y$ acts on the carriage 12, for example, the radial displacement $\alpha_1$ of the carriage 12 is given by the following equation, where $A_1$ and $A_2$ denote displacements detected by the sensors 2a and 2b and $A_3$ and $A_4$ denote displacements detected by the sensors 3a and 3b.

$$\alpha_1 = (A_1 + A_2 + A_3 + A_4)/4 \quad \text{(Math. 1)}$$

When the horizontal load $F_z$ acts on the carriage 12, the carriage 12 shifts laterally with respect to the rail 11, a gap in the horizontal direction between one of the side parts 12-2 of the carriage 12 and the rail 11 decreases, and a gap in the horizontal direction between the other side part 12-2 of the carriage 12 and the rail 11 increases. The sensors 2c and 2d detect such a change (a displacement) of the gap in the horizontal direction. It should be noted that the sensors 3c and 3d mounted to the sensor mounting member 15b (refer to FIG. 1) also detect a displacement in the horizontal direction. The horizontal displacement $\alpha_4$ of the carriage 12 is given by the following equation, where $B_1$ and $B_2$ denote displacements detected by the sensors 2c and 2d and $B_3$ and $B_4$ denote displacements detected by the sensors 3c and 3d.

$$\alpha_4 = (B_1 - B_2 + B_3 - B_4)/4 \quad \text{(Math. 2)}$$

When the pitching moment $M_a$ acts on the carriage 12, gaps between the sensors 2a and 2b and the rail 11 increase and gaps between the sensors 3a and 3b and the rail 11 decrease. Assuming that the pitch angle $\alpha_2$ is sufficiently small, for example, the pitch angle $\alpha_2$ (rad) is given by the following equation.

$$\alpha_2 = ((A_3 + A_4)/2 - (A_1 + A_2)/2)/L_1 \quad \text{(Math. 3)}$$

When the rolling moment $M_c$ acts on the carriage 12, gaps between the sensors 2a and 3a and the rail 11 decrease and gaps between the sensors 2b and 3b and the rail 11 increase. Assuming that the roll angle $\alpha_3$ is sufficiently small, for example, the roll angle $\alpha_3$ (rad) is given by the following equation.

$$\alpha_3 = ((A_1 + A_3)/2 - (A_2 + A_4)/2)/L_2 \quad \text{(Math. 4)}$$

When the yawing moment $M_b$ acts on the carriage 12, gaps between the sensors 2c and 3d and the rail 11 decrease and gaps between the sensors 2d and 3c and the rail 11 increase. Assuming that the yaw angle $\alpha_5$ is sufficiently small, for example, the yaw angle $\alpha_5$ (rad) is given by the following equation.

$$\alpha_5 = ((A_1 + A_4)/2 - (A_2 + A_3)/2)/L_2 \quad \text{(Math. 5)}$$

As described above, the five displacement components of the carriage 12 can be calculated on the basis of displacements detected by the sensors 2a to 2d and 3a to 3d.

<Calculation of Acting Loads and Contact Angles of Each Ball>

Figure 7:
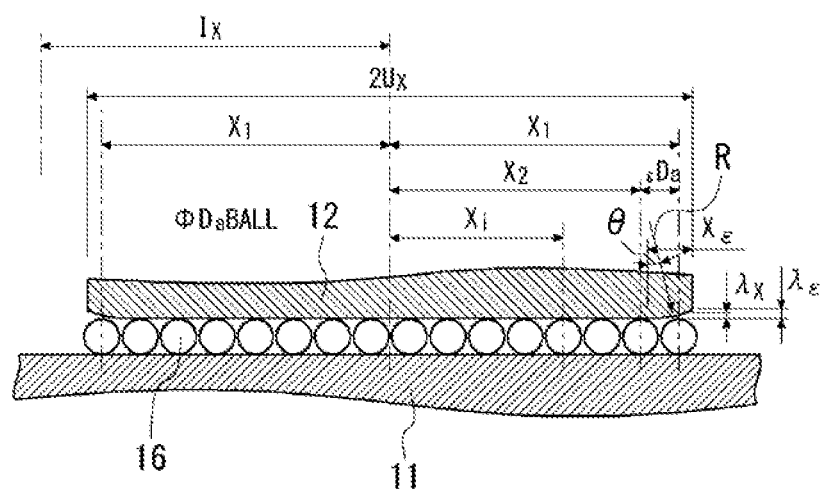
FIG. 7 is a diagram showing a portion with which balls in the carriage are in contact.

FIG. 7 shows a state where a cross section in the x axis direction of a portion with which the balls 16 are in contact inside the carriage 12 has been taken. From FIG. 7, a pitch of the balls is denoted by $\kappa D_a$ using $\kappa$ having a slightly larger value than 1 and an x coordinate of each ball is determined and denoted by $X_i$. $2U_x$ denotes a length of a portion in which the balls 16 roll inside the carriage 12. The number of balls that line up within $2U_x$ is referred to as the number of significant balls and is denoted by I. Curved surface machining with a large R-shape referred to as a crowning process is applied to both end portions of the carriage 12 so as to produce a radius of R and a depth of $\lambda_\varepsilon$.

Theoretical formulas are formed on the assumption that five displacement components or, in other words, the radial displacement $\alpha_1$, the pitch angle $\alpha_2$, the roll angle $\alpha_3$, the horizontal displacement $\alpha_4$, and the yaw angle $\alpha_5$ are generated on the carriage 12 when the five external force components or, in other words, the radial load $F_y$, the pitching moment $M_a$, the rolling moment $M_c$, the horizontal load $F_z$, and the yawing moment $M_b$ act on the carriage 12.

Figure 8:
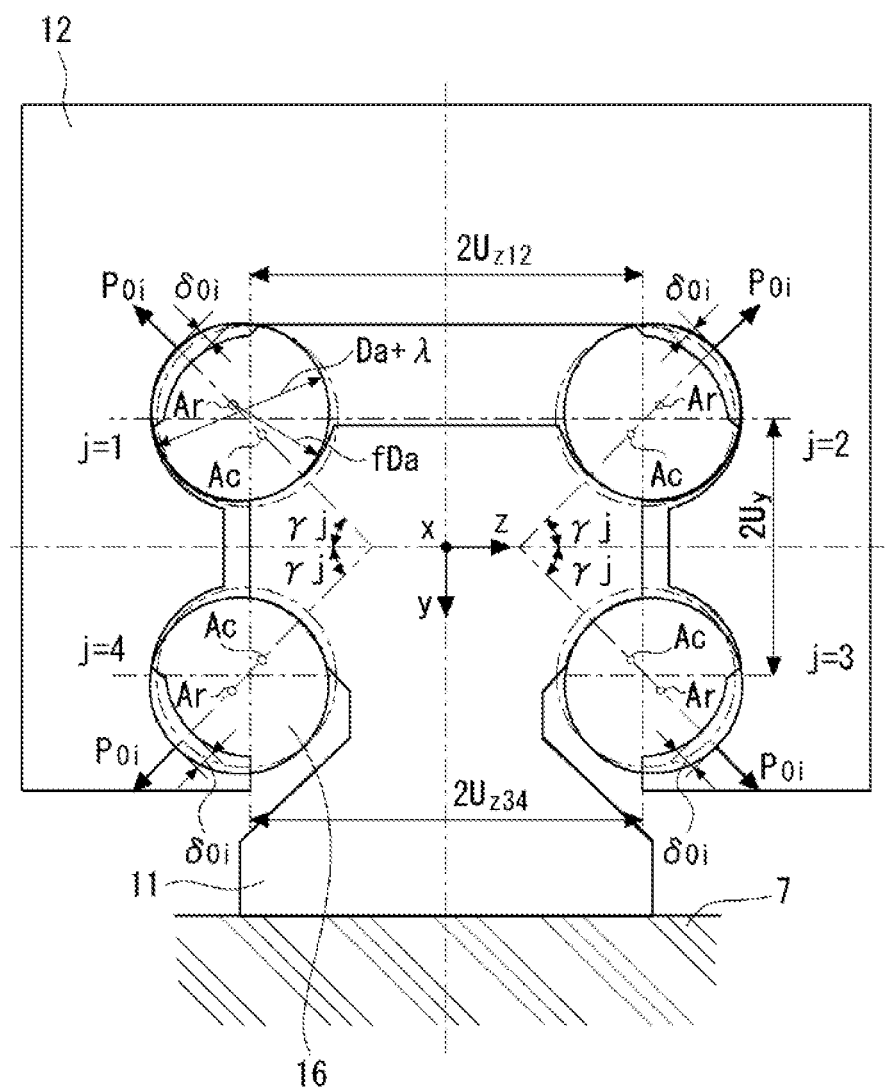
FIG. 8 is a diagram showing a state of an internal load prior to generation of five displacement components.
Figure 9:
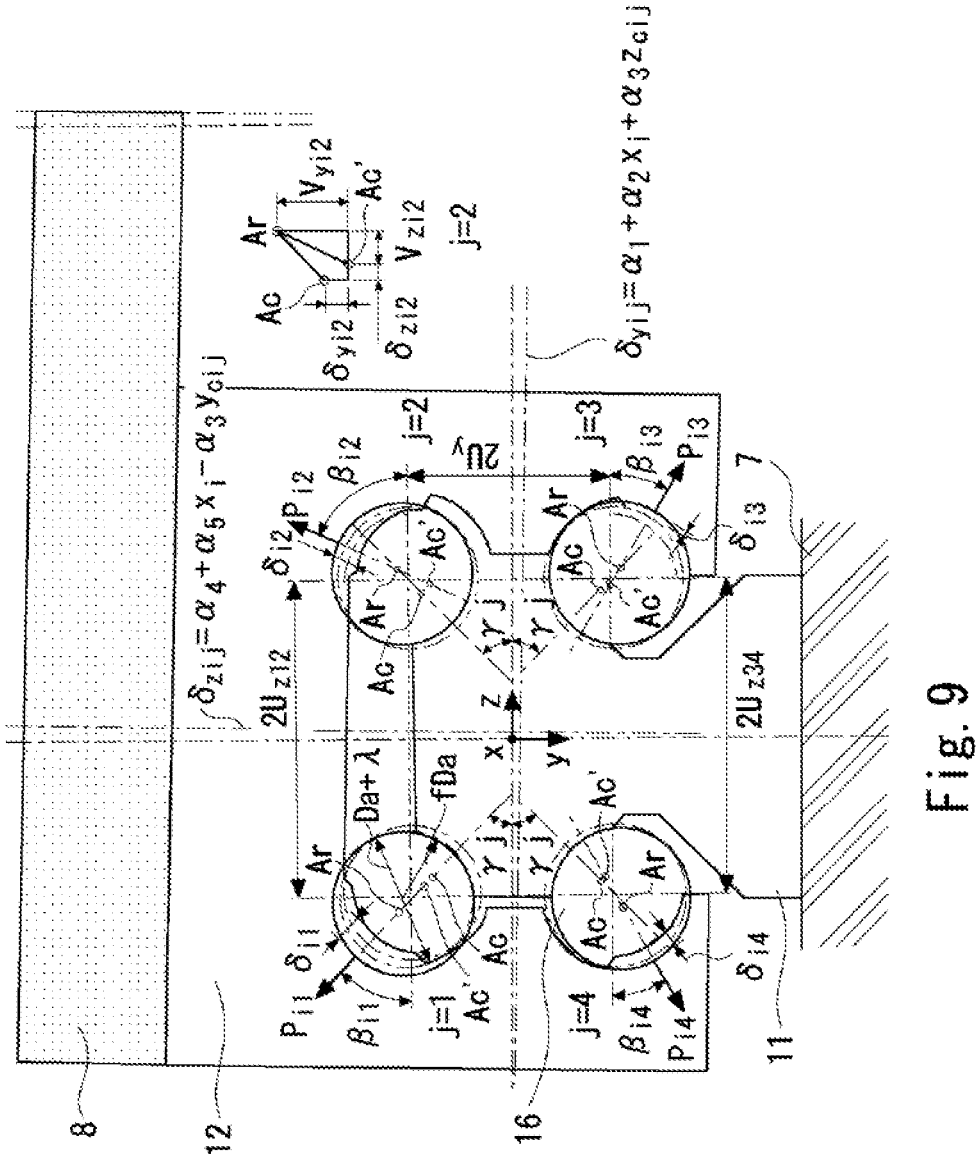
FIG. 9 is a diagram showing a state of an internal load after the generation of the five displacement components.

FIG. 8 shows a state of an internal load before the five displacement components are generated and FIG. 9 shows a state of the internal load after the five displacement components are generated of a cross section in the carriage 12 at a ball number i of the carriage 12. In this case, a ball row number in the carriage 12 is denoted by j and a ball number in a ball row is denoted by i. $D_a$ denotes a ball diameter, f denotes a degree of conformance between the rolling surface and the ball 16 on both the side of the rail 11 and the side of the carriage 12, and, consequently, $fD_a$ denotes a radius of curvature of the rolling surface. In addition, $A_r$ denotes a center of curvature position of the rail-side rolling surface, $A_c$ denotes a center of curvature position of the carriage-side rolling surface, and $\gamma$ denotes an initial state of a contact angle that is an angle formed between a line connecting $A_r$ and $A_c$ and the z angle. Furthermore, $2U_{z12}$ denotes a ball-center distance between balls 16 which respectively roll on the two rolling surfaces on an upper side of the rail 11, $2U_{z34}$ denotes a ball-center distance between balls 16 which respectively roll on the two rolling surfaces on a lower side of the rail 11, and $2U_y$ denotes a ball-center distance between balls 16 which respectively roll on a rolling surface on the upper side of the rail 11 and a rolling surface on the lower side of the rail 11.

Precompression acts on the balls 16. First, a principle of precompression will be described. Dimensions of a portion sandwiched between opposing rolling surfaces of the rail 11 and the carriage 12 are determined by dimensions of the rail 11 and the carriage 12 at the time of design and by a geometric shape of the rolling surfaces. While a ball diameter that fits into the portion is a ball diameter at the time of design, when a ball 16 with a slightly larger dimension Da+λ than the ball diameter at the time of design is assembled into the portion, according to Hertz's contact theory, the contact portion between the ball 16 and the rolling surface elastically deforms, forms a contact surface, and generates a contact stress. A load generated in this manner is an internal load that is a precompression load.

In FIG. 8, the load is denoted by $P_0$, and an amount of mutual approach between the rail 11 and the carriage 12 due to the elastic deformation of the contact portion is denoted by $\delta_0$. Although a ball position is actually at a center position between rolling surfaces of the rail 11 and the carriage 12 depicted by dashed-dotted lines in FIG. 8, since the degrees of conformance f between both rolling surfaces and the ball 16 are equal to each other, various characteristic values on the basis of Hertz's contact theory which are generated at the two contact portions of the ball 16 are the same. Therefore, the ball 16 is depicted by being moved to a position of the rail-side rolling surface in order to make the amount of mutual approach $\delta_0$ between the rolling surfaces of the rail 11 and the carriage 12 more readily understandable.

Normally, since the precompression load is defined as a radial direction load of two upper rows (or two lower rows) per one carriage, the precompression load $P_{pre}$ is expressed by the following equation.

$$P_{pre} = 2\sum_{i=1}^{I}\sum_{j=1}^{2} P_{0i} \sin\gamma_j \quad \text{(Math. 6)}$$

Next, a state where the five external force components have acted on the motion guidance device 1 from the state described above and the five displacement components have been generated will be described. As shown in FIG. 9, due to the five displacement components including the radial displacement $\alpha_1$, the pitch angle $\alpha_2$, the roll angle $\alpha_3$, the horizontal displacement $\alpha_4$, and the yaw angle $\alpha_5$ at a center of the motion guidance device 1 which is used as the coordinate origin, a relative displacement of the rail 11 and the carriage 12 has occurred at an i-th ball position.

At this point, while the center of curvature of the rail-side rolling surface does not move, since the carriage 12 moves, the center of curvature of the carriage-side rolling surface geometrically moves at each ball position. This situation is expressed as a movement of $A_c$ denoting the center of curvature of the carriage-side rolling surface to $A_c'$. When an amount of movement from $A_c$ to $A_c'$ is considered separately in the y direction and the z direction, an amount of movement in the y direction is denoted by $\delta_y$, an amount of movement in the z direction is denoted by $\delta_z$, and subsequent suffixes denote an i-th ball and a j-th ball row, the amounts of movement can be expressed as $\delta_{yij} = \alpha_1 + \alpha_2 x_i + \alpha_3 z_{cij}$ $\delta_{zij} = \alpha_4 + \alpha_5 x_i - \alpha_3 y_{cij}$ \quad (Math. 7)

where $z_c$ and $y_c$ denote coordinates of a point $A_c$.

Next, since a line connecting centers of curvature of rolling surfaces on the side of the rail 11 and the side of the carriage 12 forms a contact angle that is a normal direction of a ball load, an initial contact angle $\gamma_j$ changes to $\beta_{ij}$ and, furthermore, a distance between the centers of curvature of both rolling surfaces changes from an initial distance between $A_r$ and $A_c$ to a distance between $A_r$ and $A_c'$. This change in the distance between the centers of curvature of both rolling surfaces is manifested as an elastic deformation in both contact portions of the ball 16 and, in a similar manner to the description of FIG. 8, an amount of elastic deformation $\delta_{ij}$ of the ball 16 is determined by depicting the ball 16 as being shifted to a position of the rail-side rolling surface.

When the distance between $A_r$ and $A_c'$ is similarly considered separately in the y direction and the z direction, the distance in the y direction is denoted by $V_y$, and the distance in the z direction is denoted by $V_z$, the distances can expressed using $\delta_{yij}$ and $\delta_{zij}$ described earlier as follows.

$V_{yij} = (2f-1)D_a \sin\gamma_j + \delta_{yij}$ $V_{zij} = (2f-1)D_a \cos\gamma_j + \delta_{zij}$ \quad (Math. 8)

Accordingly, the distance between $A_r$ and $A_c'$ is expressed as $$\overline{A_rA_c'} = (V_{yij}^2 + V_{zij}^2)^{\frac{1}{2}} \quad \text{(Math. 9)}$$

and the contact angle $\beta_{ij}$ is expressed as $$\tan\beta_{ij} = \frac{V_{yij}}{V_{zij}} \quad \text{(Math. 10)}$$

As a result, the amount of elastic deformation $\delta_{ij}$ of the ball 16 is expressed as $$\delta_{ij} = (V_{yij}^2 + V_{zij}^2)^{\frac{1}{2}} - (2f-1)D_a + \lambda - \lambda_{xi} \quad \text{(Math. 11)}$$

In the state shown in FIG. 7 where a cross section in the x axis direction of a portion with which the balls 16 are in contact inside the carriage 12 has been taken, since $A_c'$ being the center of curvature of the rolling surface on the side of the carriage 12 has separated from $A_c$ being the center of curvature of the rail-side rolling surface, the amount of elastic deformation $\delta_{ij}$ of the ball 16 in the machined portion subjected to crowning has decreased by an amount corresponding to the separation. Since the separation can be regarded as equivalent to a case where the ball diameter is reduced accordingly, the amount is denoted by $\lambda_{xi}$ and subtracted in the equation given above.

Using a formula expressing an amount of elastic approach in a case where a rolling element is a ball as derived from Hertz's contact theory, a rolling element load $P_{ij}$ is obtained from the amount of elastic deformation $\delta_{ij}$ by the following equation.

$$P_{ij} = C_b \delta_{ij}^{\frac{3}{2}} \quad \text{(Math. 12)}$$

where $C_b$ denotes a nonlinear spring constant (N/mm$^{3/2}$) which is given by the following equation.

$$Cb = 2^{-\frac{3}{2}}\left(\frac{2K}{\pi\mu}\right)^{-\frac{3}{2}}\left[\frac{1}{8}\left\{\frac{3}{E}\left(1-\frac{1}{m^2}\right)\right\}^2 \sum\rho\right]^{-\frac{1}{2}} \quad \text{(Math. 13)}$$

where E denotes a longitudinal elastic modulus, 1/m denotes Poisson's ratio, $2K/\pi\mu$ denotes the Hertz coefficient, and $\Sigma\rho$ denotes a sum of principal curvatures.

According to the above, the contact angle $\beta_{ij}$, the amount of elastic deformation $\delta_{ij}$, and the rolling element load $P_{ij}$ can be expressed by equations with respect to all of the balls 16 in the carriage 12 using the five displacement components $\alpha_1$ to $\alpha_5$ of the carriage 12.

It should be noted that, in the description given above, a rigid body model load distribution theory in which the carriage 12 is considered a rigid body is used for the sake of brevity. The rigid body model load distribution theory can be expanded and a carriage beam model load distribution theory to which a beam theory has been applied in order to take the deformation of the side part 12-2 of the carriage 12 into consideration can also be used. Furthermore, a carriage-rail FEM model load distribution theory in which the carriage 12 and the rail 11 are considered FEM models can also be used.

<Calculation of Load (Five External Force Components)>

Subsequently, equilibrium condition formulas with respect to the five components as external forces or, in other words, the radial load $F_y$, the pitching moment $M_a$, the rolling moment $M_c$, the horizontal load $F_z$, and the yawing moment $M_b$ need only be set using the equations presented above.

$$F_y = \sum_{j=1}^{4}\sum_{i=1}^{I} P_{ij}\sin\beta_{ij} \quad \text{(Math. 14)}$$

With respect to the radial load $F_y$, $$M_a = \sum_{j=1}^{4}\sum_{i=1}^{I} P_{ij}\sin\beta_{ij}x_{ij} \quad \text{(Math. 15)}$$

With respect to the pitching moment $M_a$, $$M_c = \sum_{j=1}^{4}\sum_{i=1}^{I} P_{ij}\omega_{ij} \quad \text{(Math. 16)}$$

With respect to the rolling moment $M_c$,
where $\omega_{ij}$ denotes a length of a moment arm and is given by the following equation where $z_r$ and $y_r$ denote coordinates of a point $A_r$.

$$\omega_{ij} = z_{rij}\sin\beta_{ij} - y_{rij}\cos\beta_{ij}$$

$$F_z = \sum_{j=1}^{4}\sum_{i=1}^{I} P_{ij}\cos\beta_{ij} \quad \text{(Math. 17)}$$

$$M_b = \sum_{j=1}^{4}\sum_{i=1}^{I} P_{ij}co\beta_{ij}x_i \quad \text{(Math. 18)}$$

With respect to the horizontal load $F_z$,
With respect to the yawing moment $M_b$,
Using the equations presented above, the load (the five external force components) acting on the carriage 12 can be calculated.

<S103>

Next, details of step S103 will be described. The computer 6 determines whether or not the carriage 12 is moving. Whether or not the carriage 12 is moving can be determined on the basis of positional information of the carriage 12 which is detected by the linear encoder 4. For example, the computer 6 determines that the carriage 12 is moving when the positional information of the carriage 12 which is detected by the linear encoder 4 changes in a time series but determines that the carriage 12 is stationary when the positional information does not change in a time series.

<S104>

Next, details of step S104 will be described. The computer 6 detects a crest of waving on the basis of the amount of displacement and the positional information of the carriage 12 which are recorded in the data logger 5.

Figure 10:
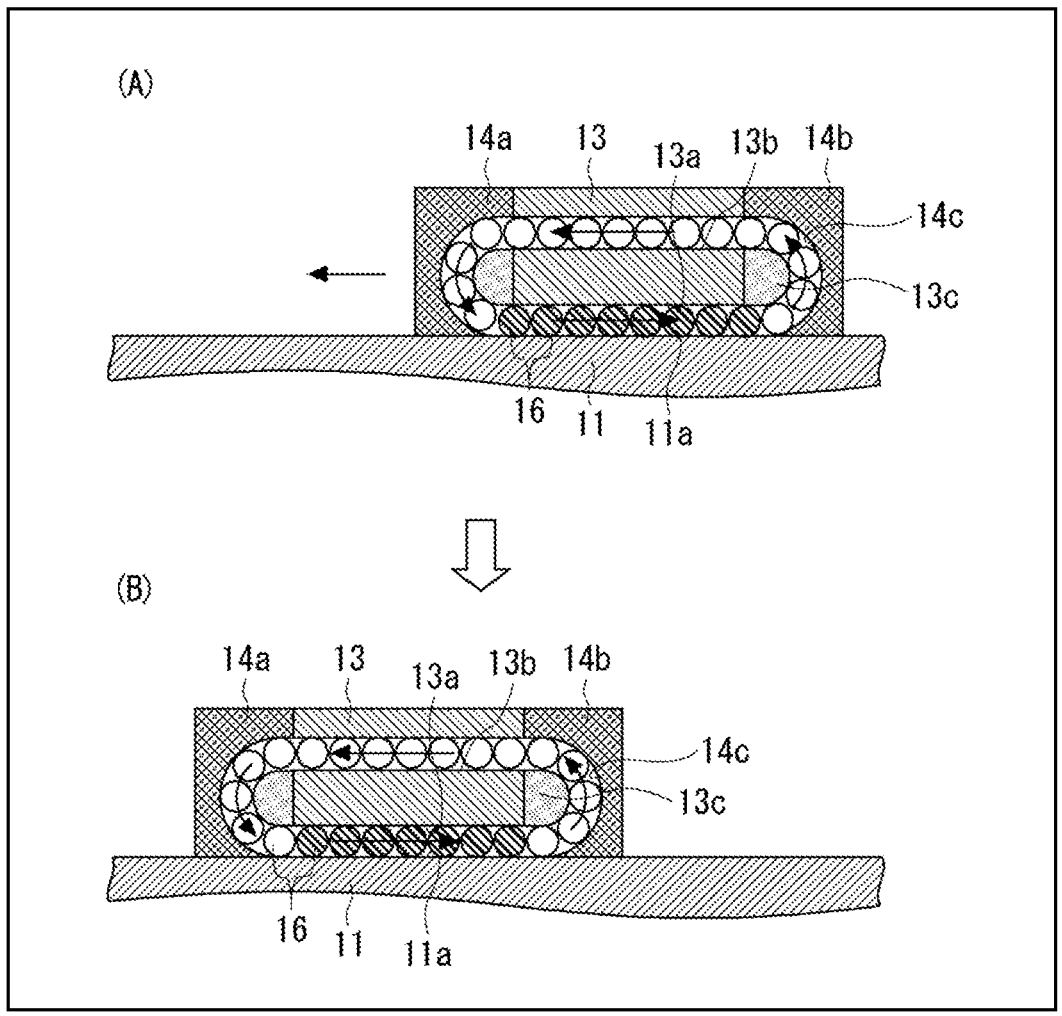
FIG. 10 is a diagram showing a movement of balls when a carriage moves along a rail.

Waving refers to an attitude change or a vibration (a pulsation) of the carriage 12 which is caused by a periodic shift in a relative position which occurs between the rolling surface 11*a* of the rail 11 and the rolling surface 13*a* of the carriage main body 13 and the balls 16. FIG. 10 is a diagram showing a movement of the balls 16 when the carriage 12 moves along the rail 11. While the carriage 12 includes a plurality of balls 16, the balls 16 which support the carriage 12 among the plurality of balls 16 are the balls 16 (the balls 16 with diagonal hatchings in FIG. 10) which are sandwiched between the rolling surface 11*a* of the rail 11 and the rolling surface 13*a* of the carriage main body 13. In addition, as is obvious from a comparison between FIG. 10(A) and FIG. 10(B), the number of balls 16 sandwiched between the rolling surface 11*a* of the rail 11 and the rolling surface 13*a* of the carriage main body 13 repetitively increases and decreases with the relative movement of the carriage 12 with respect to the rail 11. The repetition period matches a period in which the carriage 12 moves with respect to the rail 11 by an amount equivalent to a pitch between adjacent balls 16. Therefore, the crest of waving is a crest of a wave that matches a period of a shift in relative positions between the balls 16 which roll when the carriage 12 moves along the rail 11 and the rolling surfaces 11*a* and 13*a* among waveforms of displacements which are detected by the sensors 2*a* to 2*d* and 3*a* to 3*d*.

In consideration thereof, when detecting a crest of waving, the computer 6 first analyzes, for each of the five displacement components, data representing a relationship between a position of the carriage 12 on the rail 11 as obtained from the linear encoder 4 and an amount of displacement of the carriage 12 as obtained from each of the sensors 2*a* to 2*d* and 3*a* to 3*d*. In addition, the computer 6 determines a presence or absence of data representing waving among the data representing the relationship between the position and the amount of displacement of the carriage 12. With respect to the presence or absence of data representing waving, for example, when visualizing a waveform of a graph having the position of the carriage 12 on the rail 11 as an abscissa and the amount of displacement of the carriage 12 as an ordinate, a determination that waving is present is made when there is a peak that appears at approximately the same period as the pitch of the balls 16 but a determination that waving is absent is made when there is no peak that appears at approximately the same period as the pitch of the balls 16.

Figure 11:
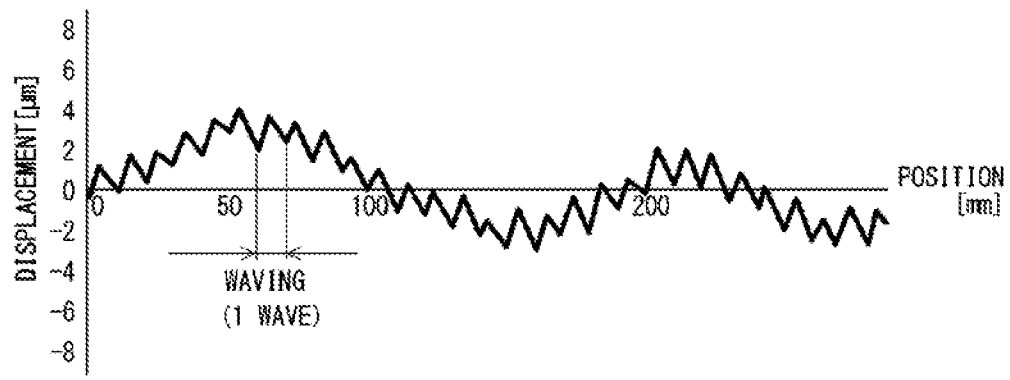
FIG. 11 is a graph with a position of a carriage detected by a linear encoder as an abscissa and a displacement detected by a sensor as an ordinate.

FIG. 11 is a graph with a position of the carriage 12 on the rail 11 as detected by the linear encoder 4 as an abscissa and a displacement detected by the sensors 2*a* to 2*d* and 3*a* to 3*d* as an ordinate. Since the carriage 12 includes the eight sensors 2*a* to 2*d* and 3*a* to 3*d* and the carriage 12 travels back and forth on the rail 11, under ordinary circumstances, there are a plurality of lines that indicate the relationship between the position and the displacement of the carriage 12. However, in order to facilitate understanding, the graph shown in FIG. 11 indicates the relationship between the position and the displacement of the carriage 12 by one polygonal line. As is apparent from the graph shown in FIG. 11, the displacement of the carriage 12 has two vibration components: a relatively slow displacement and a relatively fine displacement. Among these displacements, the former relatively slow displacement is conceivably, for example, a vibration component other than waving which is attributable to accuracy of the rolling surface 11a of the rail 11 or the like. On the other hand, the latter relatively fine displacement is a vibration component attributable to waving and is a displacement that occurs when the carriage 12 is moving on the rail 11. Intervals on the abscissa between the respective vertexes of the relatively fine displacement indicated in the graph shown in FIG. 11 are more or less consistent with the pitch of the balls 16.

On the basis of data representing the relationship between the position of the carriage 12 on the rail 11 and the amount of displacement of the carriage 12 such as the data represented by the graph shown in FIG. 11, the computer 6 detects a vibration component of fine waving that appears at a period that is more or less the same as the pitch of the balls 16 and detects a crest of the waveform of the vibration component. It should be noted that, as long as waving is detected from data of a displacement detected by any one or more sensors among the plurality of sensors 2a to 2d and 3a to 3d, the computer 6 detects a crest of the waveform of the waving.

<S105>

When the computer 6 detects a crest of the waveform of waving in step S104, the computer 6 calculates maximum shear stresses (an example of "stresses during movement" as described in the present application) which occur on the rolling surface 13a of the carriage 12 on the basis of the load calculated in step S102. In the present embodiment, in order to ascertain a lifespan due to localized fatigue of the rolling surface 13a, the computer 6 calculates the maximum shear stresses that occur on the rolling surface 13a for each virtual segment defined by dividing the rolling surface 13a along the direction of the track.

Figure 12:
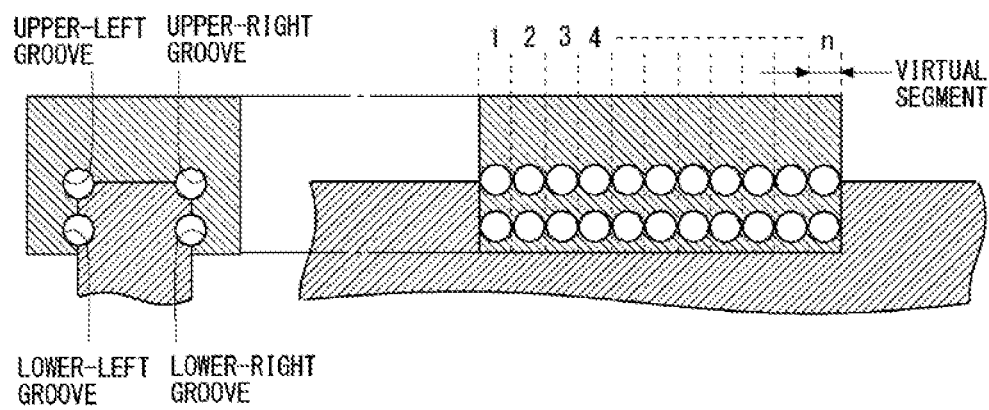
FIG. 12 is a diagram showing an example of virtual segments that divide a rolling surface.

FIG. 12 is a diagram showing an example of virtual segments that divide the rolling surface 13a. In the present embodiment, in order to facilitate understanding, a case where the maximum shear stresses are calculated for each virtual segment defined by dividing the rolling surface 13a by the number of significant balls will be described. Shear stresses that occur in each segment of the rolling surface 13a divided in this manner can be calculated in accordance with Hertz's elastic contact theory by a formula created in advance using the rolling element load $P_{ij}$ described earlier with reference to step S102 and an analytical model of a strain that occurs in a contact portion between a sphere and a plane.

Figure 13:
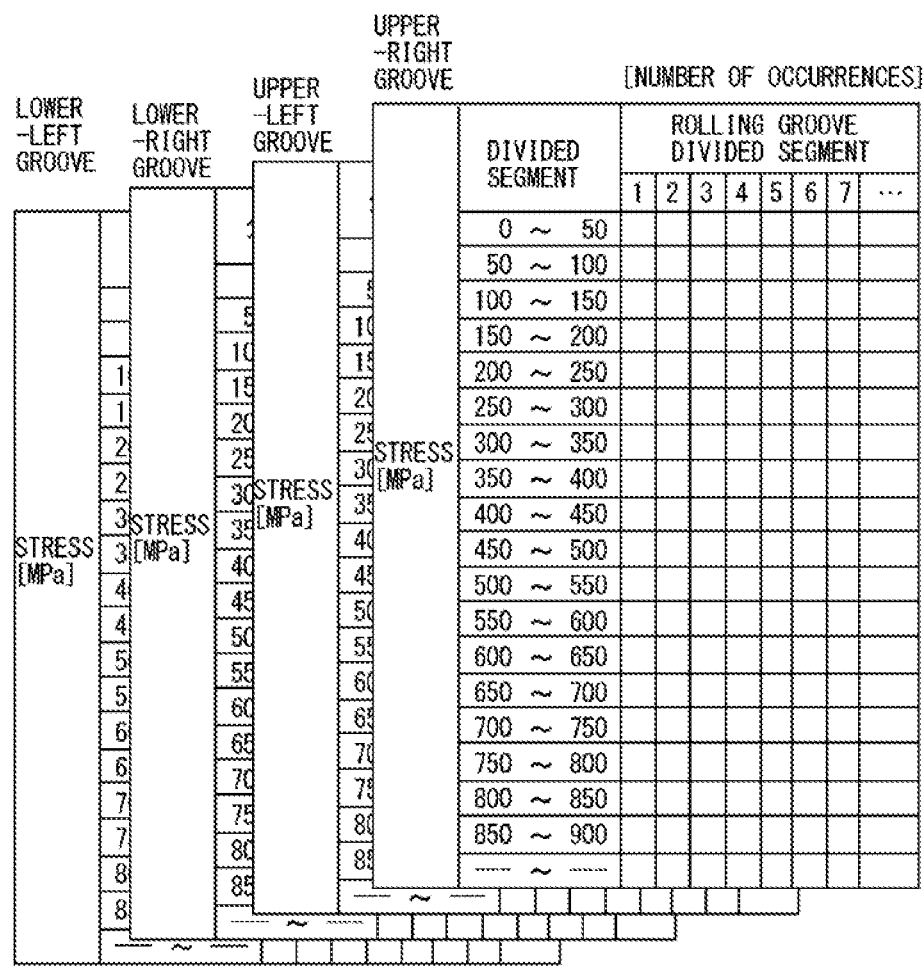
FIG. 13 is a diagram showing an example of count values of maximum shear stresses that repetitively occur on a rolling surface during a movement of a carriage.

Next, on the basis of the calculated maximum shear stresses of each segment, the computer 6 counts the number of occurrences of the maximum shear stresses for each magnitude of the stresses. FIG. 13 is a diagram showing an example of count values of the maximum shear stresses that repetitively occur on the rolling surface 13a during a movement of the carriage 12. For example, as shown in FIG. 13, the computer 6 divides step by step the magnitudes of stresses in 50 MPa increments, and adds 1 to a counter value of a division corresponding to the calculated maximum shear stresses for each waving or, in other words, for each timing where a crest occurs in the waveform of the waving shown in FIG. 11. Therefore, the counter value increases in proportion to a cumulative movement distance of the carriage 12. By aggregating the number of occurrences of stresses that cause fatigue of the rolling surface 13a for each magnitude of the stresses and for each segment, for example, even when locally repetitive stresses are occurring in a specific segment of the rolling surface 13a, basic data for a diagnosis which enables a localized fatigue of the rolling surface 13a to be reflected on a lifespan diagnosis of the motion guidance device 1 is obtained.

<S201>

Figure 14:
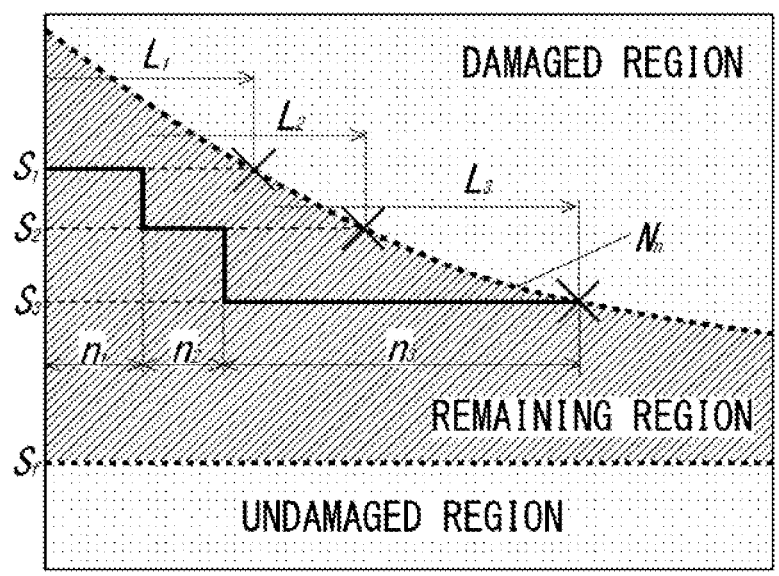
FIG. 14 is a diagram showing an example of an S-N curve of a material.

The computer 6 calculates a lifespan exhaustion ratio using an aggregate result having been aggregated by repetitively executing the first process flow. The lifespan exhaustion ratio is calculated for each segment of the rolling surface 13a. Subsequently, a value of the highest lifespan exhaustion ratio among the calculated lifespan exhaustion ratios of all segments is adopted for a lifespan diagnosis of the motion guidance device 1. The lifespan exhaustion ratios are calculated using, for example, a linear cumulative damage rule. FIG. 14 is a diagram showing an example of an S-N curve of a material. Since the linear cumulative damage rule is used for predicting a lifespan until damage is sustained due to fatigue of a material when an object is repetitively subjected to stresses, the linear cumulative damage rule is effective in ascertaining fatigue of a material due to stresses that are repetitively caused by a load amplitude that occurs when the carriage 12 is moving. According to the linear cumulative damage rule, when the number of repetitive breakage with respect to specific repetitive stresses in the S-N curve of a material to be an object is denoted by $L_i$ and the number of actual repetitions to the material is noted by $n_i$, a lifespan exhaustion ratio D is given by the following equation.

$$\sum_{i=1}^{I} \frac{n_i}{L_i} = D \qquad \text{(Math. 19)}$$

<S202>

Once the process of step S201 is finished, the computer 6 calculates a remaining usable distance (period) of the carriage 12 using a value of the highest lifespan exhaustion ratio among the lifespan exhaustion ratios of all segments calculated for each of the segments of the rolling surface 13a. For example, according to the linear cumulative damage rule, the usable distance (period) represents a case where the lifespan exhaustion ratio D equals 1. Therefore, when a cumulative movement distance of the carriage 12 obtained from positional information of the linear encoder 4 is denoted by $D_{int}$, a usable distance $D_{Life}$ can be expressed by the following equation.

$$D_{Life} = (1-D)D^*D_{int} \qquad \text{(Math. 20)}$$

In addition, when an elapsed time from the start of use of the linear encoder 4 to a time of calculation of the lifespan exhaustion ratio D is denoted by $T_{int}$, a usable period $T_{Life}$ can be expressed by the following equation.

$$T_{Life} = (1-D)D^*T_{int} \qquad \text{(Math. 21)}$$

Details of the respective processes of steps S101 to S202 described above which are executed by the computer 6 are as described above. Since the computer 6 described above performs a lifespan diagnosis using the number of vibrations of waving which represents stresses repetitively imparted to the rolling surface 13a of the carriage 12 by the balls 16, a diagnosis result with higher precision than a lifespan diagnosis performed without using the number of vibrations of waving is obtained. In addition, since the computer 6 described above counts the number of vibrations of waving by way of displacement information of the sensors 2a, 2b, 3a, and 3b which is also used to calculate stresses that occur on the rolling surface 13a of the carriage 12, a device configuration is less complex than in a case where sensors for counting the number of vibrations of waving are separately provided. Furthermore, since the computer 6 described above calculates stresses for each of virtual segments defined by dividing the rolling surface 13a of the carriage 12 along a direction of the track, a diagnosis result with higher accuracy can be obtained in comparison to a lifespan diagnosis on the basis of stresses of the entire rolling surface 13a.

REFERENCE SIGNS LIST

1 Motion guidance device
2a, 2b, 2c, 2d, 3a, 3b, 3c, 3d Sensor
4 Linear encoder
5 Data logger
6 Computer
11 Rail
12 Carriage
15a, 15b Sensor mounting member
15-1 Horizontal part
15-2 Side part
16 Ball

The invention claimed is:

1. A lifespan diagnosis device for a motion guidance device in which a moving member is assembled so as to be relatively movable to a track member via a plurality of rolling elements, the lifespan diagnosis device for a motion guidance device comprising:
a stress calculating unit configured to calculate stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member;
a counting unit configured to count, for each of the segments, on the basis of the amount of displacement, the number of occurrences of the stresses during movement which repetitively occur with waving during a movement of the moving member along the track; and
a diagnostic unit configured to calculate, for each of the segments, a lifespan exhaustion ratio on the basis of magnitudes of the stresses during movement and the number of occurrences of the stresses during movement, and diagnose the lifespan of the motion guidance device on the basis of the calculated lifespan exhaustion ratios of the respective segments.

2. The lifespan diagnosis device for a motion guidance device according to claim 1, wherein
the diagnostic unit calculates the lifespan exhaustion ratio in accordance with a linear cumulative damage rule and performs a lifespan diagnosis of the motion guidance device on the basis of the calculated lifespan exhaustion ratios of respective segments.

3. The lifespan diagnosis device for a motion guidance device according to claim 1, wherein
the diagnostic unit calculates the lifespan exhaustion ratio for each segment on the basis of data of a table in which the number of occurrences of the stresses during movement for each magnitude is aggregated for each segment.

4. The lifespan diagnosis device for a motion guidance device according to claim 1, wherein
the moving member includes a sensor that measures a distance with respect to a surface of the track member along a direction perpendicular to the track, and
the amount of displacement is acquired on the basis of an output of the sensor.

5. A lifespan diagnosis method for a motion guidance device in which a moving member is assembled so as to be relatively movable to a track member via a plurality of rolling elements, the lifespan diagnosis method for a motion guidance device comprising:
calculating stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member;
counting, for each of the segments, on the basis of the amount of displacement, the number of occurrences of the stresses during movement which repetitively occur with waving during a movement of the moving member along the track; and
calculating, for each of the segments, a lifespan exhaustion ratio on the basis of magnitudes of the stresses during movement and the number of occurrences of the stresses during movement, and diagnosing the lifespan of the motion guidance device on the basis of the calculated lifespan exhaustion ratios of the respective segments.

6. A non-transitory computer-readable storage medium stored with a lifespan diagnosis program for a motion guidance device in which a moving member is assembled so as to be relatively movable to a track member via a plurality of rolling elements,
the lifespan diagnosis program for a motion guidance device causing a computer to:
calculate stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member;
count, for each of the segments, on the basis of the amount of displacement, the number of occurrences of the stresses during movement which repetitively occur with waving during a movement of the moving member along the track; and
calculate, for each of the segments, a lifespan exhaustion ratio on the basis of magnitudes of the stresses during movement and the number of occurrences of the stresses during movement, and diagnose the lifespan of the motion guidance device on the basis of the calculated lifespan exhaustion ratios of the respective segments.

7. A lifespan diagnosis system for a motion guidance device, comprising:

a motion guidance device in which a moving member is assembled so as to be relatively movable to a track member via a plurality of rolling elements;

a stress calculating unit configured to calculate stresses during movement for each of virtual segments defined by dividing a rolling surface of the moving member along a direction of a track formed by the track member on the basis of an amount of displacement of the moving member with respect to the track, the stresses during movement being stresses that occur in each segment during a movement of the moving member;

a counting unit configured to count, for each of the segments, on the basis of the amount of displacement, the number of occurrences of the stresses during movement which repetitively occur with waving during a movement of the moving member along the track; and a diagnostic unit configured to calculate, for each of the segments, a lifespan exhaustion ratio on the basis of magnitudes of the stresses during movement and the number of occurrences of the stresses during movement, and diagnose the lifespan of the motion guidance device on the basis of the calculated lifespan exhaustion ratios of the respective segments.

* * * * *